March 25, 1952 C. W. CLAPP 2,590,753

REACTANCE TUBE CIRCUIT

Filed April 23, 1948

Inventor:
Charles W. Clapp,
by Merton D. Morse
His Attorney.

Patented Mar. 25, 1952 2,590,753

UNITED STATES PATENT OFFICE 2,590,753

REACTANCE TUBE CIRCUIT

Charles W. Clapp, Schenectady, N. Y., assignor to General Electric Company, a corporation of New York Application April 23, 1948, Serial No. 22,818

6 Claims. (Cl. 178—44)

My invention relates to tube circuits wherein a tube is arranged to supply an alternating current to an external circuit such that the current thus supplied is derived from and bears a predetermined relationship to a signal voltage appearing in such external circuit. One type of such tube circuits is generally referred to as a reactance-tube circuit, and my invention is particularly applicable to this type of circuit wherein an electron tube simulates a reactance element.

My invention also concerns filter networks comprising a simulated reactance element in the form of an electron discharge device.

An object of the invention is to provide, for use in electric circuits, an improved electronic reactance element, or an element simulating a combination of impedance elements.

A more specific object is to provide a reactance element, adapted to use in filter networks, oscillator circuits, and the like, which acts as a substantially pure reactance over a wide frequency range.

A further object of the invention is to provide an improved reactance-tube circuit which will not load the circuit associated therewith, and which will have a high effective Q.

Reactance tubes have provided convenient means in filter and oscillator circuits, and the like, for varying the filter or oscillator circuit characteristics and are often used to replace relatively bulky and expensive impedances. A particular difficulty common to such prior art devices has been associated with the excitation of the reactance tube wherein the direct current circuits necessary to supply the anode operating potential to the tube have caused a load to be placed on the anode which supplies the reactive current and have thus loaded the circuit to which the anode is connected.

It is a general object of the invention to remove or greatly reduce this loading effect of reactance tubes.

Figure 1:
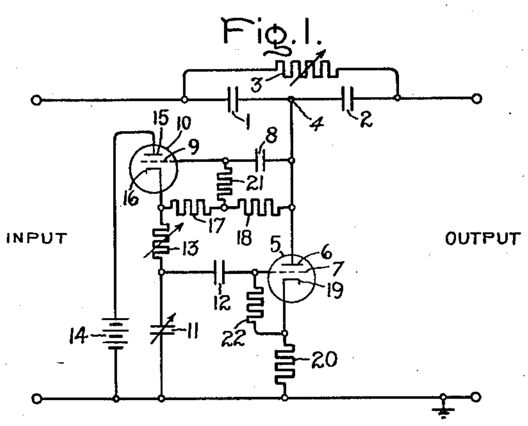
Figure 2:
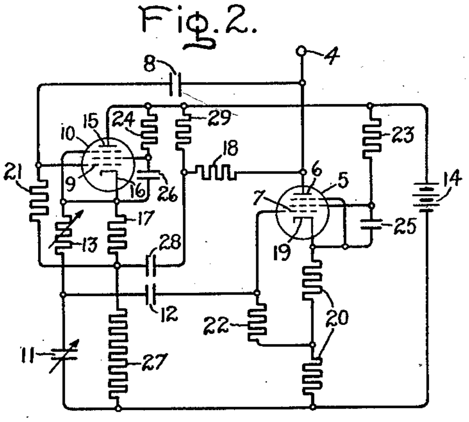
Figures 3, 4, 5:
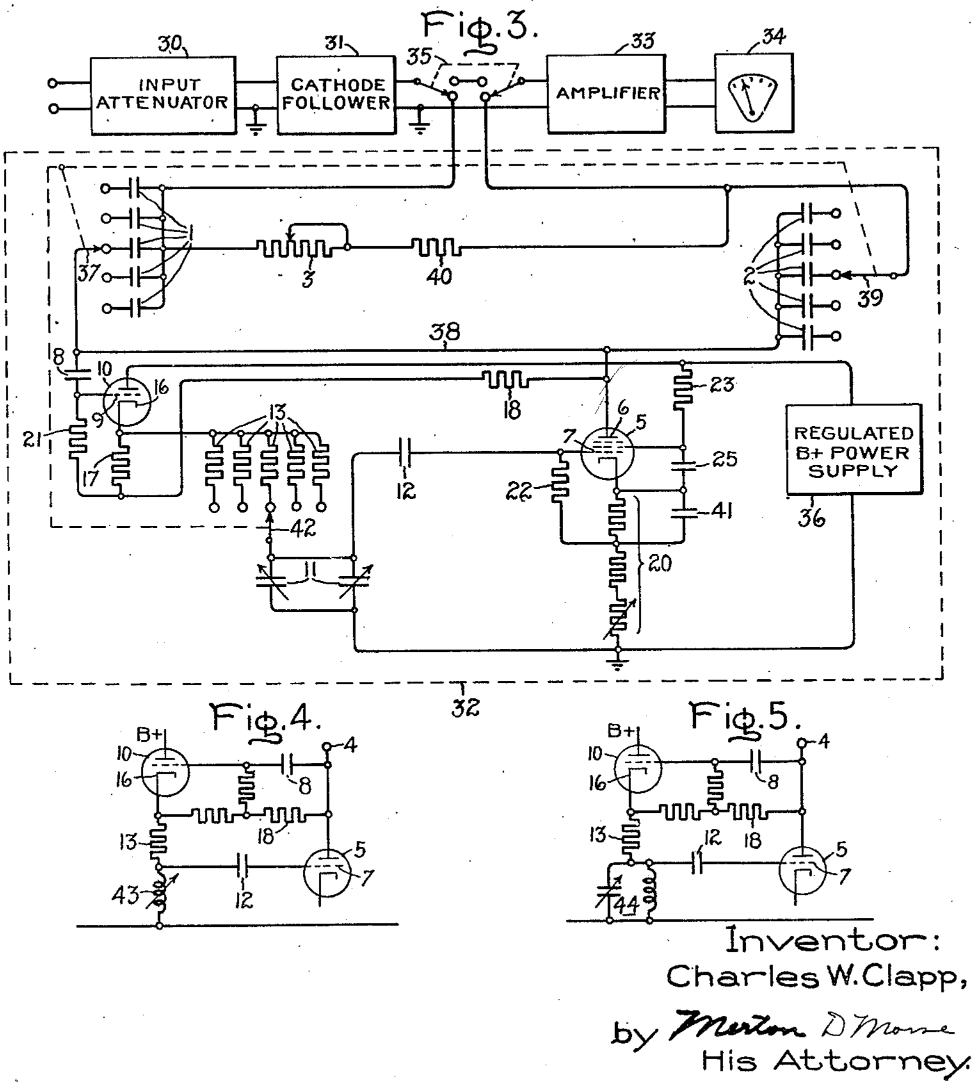

Further objects and advantages of my invention will best be understood from the following description taken in connection with the accompanying drawings in which Fig. 1 is an elementary circuit diagram of a bridged-T network comprising an electronic inductance in accord with the invention, Fig. 2 is a modified form of an electronic inductance incorporating pentode tubes, Fig. 3 is a complete practicable distortion and noise analyzer including a bridged-T network according to the invention, and Figs. 4 and 5 are schematic diagrams of portions of circuits according to my invention illustrating certain possible variations of the circuits of Figs. 1–3.

The diagram of Fig. 1 is illustrative of a bridged-T network incorporating as an operative portion a reactance-tube circuit according to the invention.

In Fig. 1 the bridge with designated input and output terminals is composed of two series capacitors 1 and 2 bridged by a variable resistor 3 and, connected between a point 4 at the juncture between the capacitors and the grounded lower conductor, an inductance element, the inductance element being a reactance-tube circuit in accord with the invention.

The reactance-tube circuit comprises a reactance tube 5 of which the anode 6 draws a current substantially in phase quadrature with the signal voltage at point 4. The signal on anode 6 is produced as a result of the application on control electrode 7 of the signal voltage at the juncture 4. The signal voltage is applied through capacitor 8 to the control electrode 9 of triode tube 10, whereby the signal, shifted in phase by substantially 90 degrees, appears across capacitor 11 in the cathode circuit of tube 10. The phase-shifted signal on capacitor 11 is furnished to control electrode 7 by coupling capacitor 12. Variable resistor 13 in the cathode circuit of tube 10 cooperates with capacitor 11 to form the phase-shift circuit, and by varying either the resistance value or the capacitance value in this circuit, or both of them, the frequency response of the circuit may be changed. Resistor 13 and capacitor 11 are each shown as variable for this purpose.

Anode operating potential for tube 5 is obtained through the anode-cathode path of tube 10. Thus a suitable source of B+ potential, battery 14, is connected directly to anode 15 of tube 10, and cathode 16 is connected through a biasing resistor 17 for tube 10 and, in series therewith, a relatively high value resistor 18 for supplying the direct current to anode 6 of tube 5. The cathode 19 of tube 5 is returned to the negative terminal of the source 14 through a suitable degenerative resistor 20 to improve the linearity between anode current and the voltage applied to the control electrode. This resistor may be variable if desired, and for increased value will increase the value of the simulated inductance. The return for control electrode 9 of tube 10 is through a leak resistor 21 to the juncture of resistors 17 and 18, and the return for control electrode 7 of tube 5 is through a leak resistor 22 to the cathode 19 or to a tap on resistor 20.

In operation it will be found that the alternating current voltage appearing on the cathode 16 of tube 10, as well as the voltage at the adjacent end of resistor 18, will be substantially equal to the voltage at the juncture 4 of capacitors 1, 2. The resistor 18, therefore, offers minimum loading of the filter network. Resistor 18 may have a resistance of the order of 100,000 ohms and as mentioned, carries very little alternating current. The alternating-current voltage across resistor 18 may be, for instance, about 2 percent of the voltage between terminal 4 and ground, depending on the closeness with which cathode 16 follows the control electrode 9 and the small drop in resistor 17. The alternating current drawn by the anode of tube 5 is the desired quadrature current, and the current thus drawn causes the reactance-tube circuit comprising tubes 10 and 5, of which tube 5 is, of course, the reactance tube, to function, with respect to the condenser junction, as a high Q inductance. It will be understood that the input impedance to the control electrode of tube 10 is very high since this tube operates as a cathode follower.

The reactance-tube circuit of Fig. 2 is similar to the circuit connected to juncture 4 of Fig. 1, but in addition to its being modified to use pentode tubes (a modification that may be readily accomplished, of course, in the circuit of Fig. 1) by the addition of screen electrode voltage dropping resistors 23, 24 and bypass capacitors 25, 26, as shown, and by adding suppressor electrode connections to the respective cathodes, there has been provided a cathode load resistor 27 for tube 10 and a coupling capacitor 28 for providing the signal generated across resistor 27 by the cathode follower operation of tube 10 to the end of resistor 18 at a point remote from anode 6 of tube 5. Resistor 29 provides direct current from the source 14 to operate tube 5. Thus B+ operating potential for tube 5 is not drawn through the anode-cathode path of tube 10. Also in Fig. 2, cathode resistor 20 of tube 5 is shown as comprising two portions with the control electrode return through resistor 22 made to the juncture of these portions to establish the desired bias for the control electrode.

The operation of the circuit of Fig. 2 is similar to that described for Fig. 1. Similarly arranged parts of Figs. 1 and 2 which perform similar functions are similarly numbered. The signal at point 4 is fed through coupling capacitor 8 to the control electrode 9 of tube 10 producing a signal similar to that at point 4 on cathode 16, across resistors 17 and 27 in series. This signal is subjected to a phase shift in the capacitor-resistance network 11, 13 for application to control electrode 7 of tube 5 through coupling capacitor 12. The signal from cathode 16 is applied without phase shift to a point on the resistor 18 such that the signal will not be grounded through the potential supply 14, being isolated therefrom by resistor 29. The application of this signal as described prevents the flow of substantial alternating current through resistor 18 since the opposite ends thereof are at substantially the same alternating current voltage. There is, accordingly, very little loading to lower the Q of the simulated reactance.

The circuit of Fig. 2 though using a few more component parts than the circuit of Fig. 1, may be better adapted to certain applications where, for instance, tubes 5 and 10 are designed for anode currents of different values. The Q of the circuit of Fig. 2 may be slightly less than that of Fig. 1 modified to include pentode tubes.

Fig. 3 is a schematic diagram of a distortion and noise analyzer adapted for use in testing amplifiers, as for instance audio amplifiers, and demonstrates a particular application of my invention. The instrument comprises, preferably, an input attenuator 30 with suitable input terminals for providing an input signal of adjustable volume or strength to a suitable wide band cathode follower or amplifier stage 31. The output of cathode follower stage 31 is fed through a bridged-T network, indicated generally at 32, of the type incorporating my invention and wherein signals of a desired frequency are greatly attenuated while signals of all other frequencies, including all harmonics and sub-harmonics of the blocked frequency, are passed with very little attenuation. The signals passed by the filter are amplified in a wide band amplifier 33 and the magnitude thereof is measured or indicated by an alternating current meter 34, which may be calibrated in decibels if desired.

In utilizing the analyzer of Fig. 3, the output terminals of an amplifier to be tested are connected to the input terminals of attenuator 30, and a signal of a desired single frequency is supplied to the input of the amplifier under test by a high-quality audio signal generator with low noise voltage. The amount of noise and distortion generated by the amplifier under test is indicated on meter 34 when the filter network 32 is adjusted to block the single frequency of the audio signal generator.

A switch is arranged intermediate to amplifiers 31, 33 to disconnect and to bypass filter network 32 for the purpose of calibrating meter 34, whereby the full output of the audio signal generator may be measured, as well as the output of the amplifier under test, without attenuation of any frequency. The resultant readings provide an indication of amplifier gain. The instrument may also be utilized with the switch 35 in the position shown in the figure with the filter network in the circuit to test the audio signal generator output directly for distortion or noise components. If such components are present in the signal generated, allowance for their presence should be made in determining amplifier characteristics.

The bridged-T network 32 as used in the practical instrument of Fig. 3 comprises a triode tube 10 as a cathode follower and a pentode 5 as the reactance tube. A voltage regulated rectifier power supply 36 is used for supplying B+ operating potential, and ganged switches are arranged to select suitable frequency ranges by switching desired capacitors 1 and 2 and corresponding resistors 13.

The signal from amplifier 31 is applied through a selected capacitor 1 to switch armature 37, through conductor 38, representing the juncture 4 between the capacitors of the filter network of Fig. 1, through a selected capacitor 2 and switch armature 39 to amplifier 33. Series capacitors 1, 2 are bridged by a resistor comprising a fixed portion 40 and variable portion 3. It will be understood that this resistor compensates for negative resistance characteristics of a T filter consisting of series capacitors and a parallel inductance.

The signal from conductor 38 is applied through coupling capacitor 8 to control electrode 9 of triode tube 10. The signal which appears on cathode 16 is shifted in phase by the network including capacitors 11 and a selected one of resistors 13 and supplied through coupling capacitor 12 to the control electrode 7 of reactance tube 5. A signal substantially equal to that appearing on conductor 38 is applied from cathode 16 to the end of resistor 18 remote from anode 6 whereby in-phase current loading of conductor 38 is prevented, and only the desired quadrature current is supplied to conductor 38 by anode 6 of tube 5.

The cathode circuit of tube 5 includes an upper fixed portion of resistor 20 connected to the cathode and bypassed by a large capacitor 41. The control electrode is returned through resistor 22 to the lower end of this bypassed self-biasing portion. The lower portion of resistor 20 comprises an additional fixed portion, and a variable portion for preliminary frequency adjustment. The variable portion of resistor 20 may be preset, together with one of the variable capacitor elements comprising capacitor 11, to properly calibrate the frequency controls of the instrument. As heretofore explained, increasing the value of this resistor increased the value of the simulated inductance. The other element of capacitor 11 is one of the main tuning controls and operates to vary the frequency characteristics of the filter within the bands selected by the position of ganged switch armatures 37, 39 and 42, the armature 42 being used to select the desired resistor 13, and armatures 37 and 39, to select the desired capacitors 1 and 2, respectively.

In practice, tube 10 may be one-half of a type 6SL7 dual-triode tube, the other half of which may be conveniently used in cathode-follower coupling device 31, and tube 5 may be a type 6SJ7. To tune the filter network from 50 to 150 cycles, capacitors 1 and 2 of .01 microfarad may be selected with a resistor 13 of 15 megohms. Assuming a main tuning capacitor 11 variable from 200 to 4200 micromicrofarads, bypassed by a preset trimming capacitor of about 25 micromicrofarads, tuning of the main tuning capacitor, the range of 50 to 150 cycles will be completely covered by varying the main tuning capacitor. Resistor 3 may be of 100,000 ohms, maximum, and resistor 40 may be a fixed resistor of 56,000 ohms. The negative resistance of the network throughout this frequency range may be properly compensated by suitable adjustments of resistor 3 to obtain optimum blocking of the frequency to be blocked.

A frequency range of 150 to 500 cycles may be obtained by moving armatures 37, 39 and 42 to select capacitors 1 and 2 of .003 microfarad capacitance each and a resistor 13 of 5 megohms. A range of 5000 to 15000 cycles is obtained by selecting capacitors 1 and 2 of .0001 microfarad each and a resistor 13 of 150,000 ohms. Intermediate ranges between 500 and 5000 cycles are obtained by selecting suitable intermediate values of these elements. By way of further example, the filter will reject signals of 1000 cycles with capacitors 1 and 2 of .001 microfarad each, a resistor 13 of 1.5 megohms, with resistors 3 and 40 providing a total series resistance of approximately 125,000 ohms and with the main tuning capacitor 11 adjusted to approximately 900 micromicrofarads.

The Q of the reactance simulated by tube 5 at any frequency between 50 and 15,000 cycles is approximately 6, though a Q of 15 is obtainable for a single fixed frequency by a careful selection of circuit constants. A sharp rejection characteristic for the filter is dependent upon the Q of the reactance and characteristics comparable to those obtained by the circuit of Fig. 3 are almost unobtainable with practicable inductance coils, since the Q of variable inductance coils of the size needed to reject signals of 50 cycles is normally less than 6. A coil of the requisite characteristics for this frequency would be of the order of 500 henries. In addition, a large number of coils would have to be provided to cover a range of 50–15,000 cycles, since the inductance for 15,000 cycles is about 0.6 henry. In a reactance tube according to the prior art, wherein the B+ operating potential is supplied to a load resistor connected to the anode of the reactance tube, and thus to the circuit using the reactance effect, the Q is of the order of half of that obtained by a circuit in accord with Fig. 3, since the load resistor is a relatively low impedance for the alternating current voltage, and the resultant rejection characteristic of the filter is substantially broader due to the lower Q.

In effect, tube 10 can be considered as an infinite impedance for signals at juncture 4. This infinite impedance prevents any loading of the juncture 4 by the low impedance power supply 36.

Figs. 4 and 5 disclose portions of circuits according to the invention in which tube 5 simulates, at a point 4, a capacitive reactance (Fig. 4) and a series resonant circuit (Fig. 5). It will be understood that the circuits of Figs. 4 and 5 are not complete but are intended to indicate possible variations of the circuits of Figs. 1–3. In Fig. 4, the signal supplied through capacitor 8 and appearing on cathode 16 of tube 10 is applied to the end of resistor 18 remote from anode 6 of tube 5 whereby, as in the circuits of previously discussed figures, substantially no alternating current flows in resistor 18. The phase shift circuit comprises a resistor 13 and an inductance 43, rather than a capacitor 11 as heretofore, and provides a phase-shifted signal to control electrode 7 of tube 5, through capacitor 12, such that tube 5 supplies alternating current to point 4 leading the voltage of point 4 by substantially 90 degrees for a wide band of frequencies. Inductance 43 may be made fixed or variable as shown, as may be resistance 13, as desired, to alter the value of the capacitance simulated by tube 5, and the value may be changed or preset by varying the cathode resistor of tube 5 in Fig. 3.

In Fig. 5, the capacitor 11 of Figs. 1–3 is replaced by a parallel tuned circuit 44, comprising a parallel connected capacitor and inductance. The capacitor is shown as variable, though, of course, either, neither or both the capacitor and inductance may be variable as desired. As is the case in Fig. 4, elements or portions of the circuit of Fig. 5 functioning in the same or similar manner to corresponding elements or portions of the circuit of Fig. 1 bear the same reference numerals.

While Figs. 1 and 3 disclose an inductive reactance simulating circuit according to the invention used in a bridged-T network, it will be understood that the bridged-T network itself forms no part of the present invention except insofar as the novel reactance-tube circuit possesses particular advantages when used in a network of the type shown. On the other hand, the reactance-tube circuits of Figs. 1, 2, 3 and 4 are of general applicability as, for instance, in other types of networks or in oscillator circuits and the like, or in other applications where it may be desired to simulate a frequency responsive element or elements. If it be desired to simulate a parallel-tuned circuit, a series-tuned circuit may be substituted for circuit 44 of Fig. 5, and other modifications will be apparent to those skilled in the art. In general, it may be said that the impedance simulated by tube 5 will be the reciprocal of the impedance of the element, or combination of elements, in series with resistor 13, times a constant determined by the tube and circuit constants. Resistor 13 should be of high value in comparison with the impedance in series therewith if this relationship is to be maintained. It is practicable to substitute other types of phase shift circuits in the cathode circuit of tube 10. In Fig. 4, for example, resistor 13 may be replaced by a high impedance capacitor and inductance 43 replaced by a low resistance, whereby tube 5 still simulates a capacitor.

Accordingly, while a specific embodiment has been shown and described, it will, of course, be understood that various modifications may be made without departing from the invention. The appended claims are therefore intended to cover any such modifications within the true spirit and scope of the invention.

What I claim as new and desire to secure by Letters Patent of the United States is:

1. A reactance-tube circuit for simulating a reactance between a reference point and a second point having an alternating voltage thereon, said circuit comprising a cathode follower discharge device with a control electrode, means for supplying the alternating voltage at said second point to said control electrode whereby substantially the same voltage appears on the cathode of said discharge device, phase shifting means connected to said cathode for providing a voltage shifted in phase from said cathode voltage, means to apply said phase shifted voltage to the control electrode of a second discharge device, an anode in said second device, an impedance in the anode circuit of said second device, means for furnishing said cathode voltage to said impedance remote from said anode, and alternating current conductive means connecting said anode to said second point.

2. A reactance-tube circuit comprising a cathode follower electron discharge device with a control electrode, means for impressing on said control electrode a first signal for which the reactance is to be effective whereby said signal is reproduced on the cathode of said device, a phase shift circuit connected to receive the reproduced signal from the cathode of said device and producing a phase shifted signal, a second electron discharge device with an anode, a cathode, and a control electrode connected to receive said phase shifted signal, an impedance connected to said anode, and electric conducting means connected between the cathode of said first discharge device and a point on said impedance remote from said anode for applying said reproduced signal from said cathode of said first discharge device to said impedance whereby an anode-cathode circuit of said second discharge device draws current in quadrature to said first signal but imposes substantially no in-phase load for a reactance effective connection with said first signal.

3. In combination, an alternating current circuit, high input impedance means connected to receive the voltage appearing at a point in said circuit, said means being operative to provide a second voltage of the same phase and frequency as said first voltage, an electron discharge device with an anode, a cathode and a control electrode, an anode-cathode circuit for said device comprising an impedance element; a phase shifting circuit responsive to said second voltage for providing a third voltage differing in phase from said second voltage and connected to impress said third voltage between said control electrode and said cathode, means coupling said anode to said point, whereby a current corresponding to said third voltage is supplied to said point, and electric conducting means connected to receive said second voltage and to impress said second voltage on said impedance element to alter the reactive effect of said anode-cathode circuit current at said point.

4. A simulated inductance comprising an electron-discharge device with an anode, a cathode and a control electrode, and having an anode-cathode circuit comprising in series an impedance and the anode-cathode path of a second electron discharge device and a low impedance source of direct current operating potential, a control electrode in the anode-cathode path of said second discharge device, one end of said impedance comprising one terminal of said simulated inductance, means for applying the signal appearing at said one end to the control electrode of said second device, phase shift means connected between the other end of said impedance and the control electrode of said first mentioned discharge device for applying a signal in phase quadrature to the signal at said one end to the control electrode of said first mentioned discharge device whereby the alternating current flowing through said first discharge device is in phase quadrature to the voltage appearing at said one end, the other terminal of said simulated inductance being connected for alternating current to a point of said anode-cathode circuit in low alternating current impedance relationship to a terminal of said source of operating potential.

5. A reactance-tube circuit comprising a cathode follower electron discharge device with a control electrode, means for impressing on said control electrode a first signal for which the reactance is to be effective whereby said signal is reproduced on the cathode of said device, a phase shift circuit connected to receive the reproduced signal from the cathode of said device and to produce a phase shifted signal, a second electron discharge device with an anode, a cathode, and a control electrode connected to receive said phase shifted signal, an impedance element connected to said anode, a degenerative impedance connected to the cathode of said second device, and means applying said reproduced signal from said cathode of said first device to a point on said impedance element remote from said anode, whereby the anode-cathode circuit of said second discharge device imposes substantially no in-phase load for a reactance effective anode connection to said first signal and whereby said second device simulates a reactance for said first signal of value determined in part by the value of said degenerative impedance.

6. A reactance-tube circuit comprising a cathode follower discharge device with an anode, a cathode and a control electrode, a phase shift circuit connected to said cathode, a second discharge device with an anode, a cathode and a control electrode, said last control electrode being coupled to said phase shift circuit, an impedance connected from said anode of said second device to the cathode of said first device, an alternating voltage conductive connection from said anode of said second device to the control electrode of said first device, and a potential source with a positive terminal connected to the anode of said first device and a negative terminal connected to the cathode of said second device, whereby said second device simulates a reactance for voltages applied between its anode and a terminal of said source.

CHARLES W. CLAPP.

REFERENCES CITED

The following references are of record in the file of this patent:

Article: "A New Type of Practical Distortion Meter," Proceedings of the I. R. E., vol. 31, No. 3, March 1943, pages 112–117. (Copy in 178–44–19A.)